(12) United States Patent
Zhang et al.

(10) Patent No.: US 6,773,597 B2
(45) Date of Patent: Aug. 10, 2004

(54) METHOD AND APPARATUS FOR REDUCING EXCESS SLUDGE

(75) Inventors: Shu Ting Zhang, 1-3-501, Mizobata-cho, Sakado-shi, Saitama 350-0274 (JP); Toshiki Yoshimura, Saitama (JP); Kunihiko Miseki, Saitama (JP)

(73) Assignees: Able Co., Ltd., Saitama (JP); Shu Ting Zhang, Saitama (JP)

( * ) Notice: Subject to any disclaimer, the term of this patent is extended or adjusted under 35 U.S.C. 154(b) by 123 days.

(21) Appl. No.: 10/169,366

(22) PCT Filed: Oct. 9, 2001

(86) PCT No.: PCT/JP01/08842
§ 371 (c)(1),
(2), (4) Date: Oct. 8, 2002

(87) PCT Pub. No.: WO02/088033
PCT Pub. Date: Nov. 7, 2002

(65) Prior Publication Data
US 2003/0136733 A1 Jul. 24, 2003

(30) Foreign Application Priority Data
Oct. 6, 2000 (JP) ........................................ 2000-308485

(51) Int. Cl.[7] .............................................. C02F 11/12
(52) U.S. Cl. ........................ 210/609; 210/625; 210/631; 210/748
(58) Field of Search ................................ 210/631, 623, 210/624, 625, 639, 710, 748, 609

(56) References Cited

U.S. PATENT DOCUMENTS 4,370,235 A 1/1983 Suzuki et al.
6,106,717 A * 8/2000 Hasegawa et al. .......... 210/607
6,444,124 B1 * 9/2002 Onyeche et al. ............ 210/603

FOREIGN PATENT DOCUMENTS

| JP | 55-008835 | | 1/1980 |
|---|---|---|---|
| JP | 02-099199 | | 4/1990 |
| JP | 02-227191 | | 9/1990 |
| JP | 05-345192 | | 12/1993 |
| JP | 07-323300 | | 12/1995 |
| JP | 07-328696 | | 12/1995 |
| JP | 08-281299 | | 10/1996 |
| JP | 11-128975 | | 5/1999 |
| JP | 11-147100 | | 6/1999 |
| JP | 11-156399 | | 6/1999 |
| JP | 2000271598 A | * | 10/2000 |
| JP | 2001038397 A | * | 2/2001 |

* cited by examiner

Primary Examiner—Robert A. Hopkins
(74) Attorney, Agent, or Firm—Pearne & Gordon LLP

(57) ABSTRACT

The invention offers a method and apparatus for solubilizing excess sludge, having a high solubilizing ability, a low total cost, and capable of reducing the size of facilities. The method for reducing excess sludge comprises adding a solubilizing agent to excess sludge generated by microbial treatment of organic sewage, applying ultrasonic waves, applying a reduced pressure swelling step, then returning the result to the microbial treatment, whereby the volume of the excess sludge can be reduced. The apparatus for reducing excess sludge comprises means for adding a solubilizing agent to excess sludge generated by applying a microbial treatment to organic sewage, ultrasonic wave applying means for applying ultrasonic waves, and reduced pressure swelling means provided downstream of the ultrasonic wave applying means for applying a reduced pressure swelling process to the excess sludge.

8 Claims, 2 Drawing Sheets

METHOD AND APPARATUS FOR REDUCING EXCESS SLUDGE

FIELD OF THE INVENTION

The present invention relates to a method for reducing the excess sludge generated in the biological treatment of various types of organic waste fluid, and an apparatus for reducing excess sludge using this method.

BACKGROUND OF THE INVENTION

The organic waste fluid which is discarded in the form of various types of industrial waste fluids as well as domestic sewage is primarily treated by biological methods such as by using activated sludge. Since the microbes used can proliferate in abundance during this process, creating massive amounts of excess sludge whose disposal can present a problem. As methods for handling this type of excess sludge, it has been used for improving soil or as compost, but no fundamental solution has yet been reached, so that in most cases, the excess sludge is dehydrated and incinerated or buried as industrial waste.

However, in recent years, such incineration has come to be seen as possibly posing a threat by generating toxic substances including environmental hormones such as dioxins, and burial ultimately also gives rise to similar problems in the form of toxic substances which can leak out over time. Therefore, there has been a call for development of techniques for reducing the excess sludge itself to provide a more fundamental solution to the problem, and many proposals have been offered.

Among these, the methods of Japanese Patent No. 2806495, Japanese Patent Application, First Publication No. H11-128975 and Japanese Patent Application No. H11-218022 are relatively inexpensive and easy to control. All of these methods involve the addition of alkalis to the excess sludge followed by exposure to ultrasonic waves.

However, the method of Japanese Patent Application, First Publication No. H11-128975 is performed at a pH of 10.5 or less in consideration of the cost of neutralization that is required when returning the solubilized excess sludge to the biological treatment, so that the expected solubilization effect is difficult to achieve with this method.

The method of Japanese Patent Application No. H11-218022 enables the pH to be raised to 12–13 by improving on the neutralization procedure, thus improving the solubilization effect, but a lot of time is still required for the ultrasonic treatment, which requires high output and is therefore very expensive. Additionally, the ability of microbes to be used for decomposition leaves something to be desired, to the point of being difficult to put into actual practice. In connection with the art described above, there has been a strong demand for technological improvements that would allow for cost reductions and improved effectiveness by obtaining the desired level of solubilization effects, and particularly the ability of microbes to be used for decomposition, even with a low ultrasonic output and a short time of application thereof.

SUMMARY OF THE INVENTION

The present invention has the object of offering a method and apparatus for solubilizing excess sludge, with a higher capacity for solubilization than conventional methods, having a low overall cost and allowing equipment to be made smaller.

A method for reducing excess sludge according to claim 1 of the present invention is characterized by adding a solubilizing agent to excess sludge generated by a microbial treatment of organic sewage; applying ultrasonic waves; applying a reduced pressure swelling treatment; and returning the result to the microbial treatment, thereby reducing the volume of said excess sludge.

Due to this method, a high level of solubilization can be obtained by the reduced pressure swelling process, thus resulting in a particularly high level of reusability by microbes, and achieving a high rate of reduction.

Another method for reducing excess sludge according to the present invention is characterized in that said solubilizing agent is an alkali, a bacteriolytic agent, or a combination thereof.

According to this method, the alkalis contribute to the dissolution of proteins, are not harmful to the environment if neutralized, and further in biological treatment systems, and can be used to adjust the pH prevent reductions in pH due to dissolution of carbon dioxide gas. While possible alkalis include, for example, NaOH, KOH, $Mg(OH)_2$ and $Ca(OH)_2$, other compounds may be used as long as they are capable of raising the pH.

Additionally, the bacteriolytic agent has the function of destroying the cell walls of microbes. While there are many types of bacteriolytic agents, the type does not matter as long as it is capable of decomposing bacteria. Examples include hydrogen peroxide, dichlorous soda and ozone.

An apparatus for reducing excess sludge according to another embodiment of the present invention is characterized by comprising means for adding a solubilizing agent to excess sludge generated by microbial treatment of organic sewage; ultrasonic wave applying means for applying ultrasonic waves; and reduced pressure swelling means, provided downstream of the ultrasonic wave applying means, for applying a reduced pressure swelling process to the excess sludge.

According to this embodiment, a high rate of solubilization is achieved by the reduced pressure swelling means, thus resulting in a particularly high level of reusability by microbes, and achieving a high rate of reduction.

An apparatus for reducing excess sludge according to another embodiment of the present invention is characterized in that the reduced pressure swelling means is a homogenizer.

According to this embodiment, solubilizing agents such as alkalis and ultrasound are used to destroy or damage the cell walls of microbes, and a reduced pressure swelling process causes the contents of the cells to leak out, after which further reactions by solubilizing agents causes them to be converted to substances which can be handled by microbes. Whereas the solubilization effect due to the reduced pressure swelling can be raised by raising the pressure of the homogenizer, the optimum operating conditions may be determined in consideration of the manufacturing cost and running cost of the apparatus.

An apparatus for reducing excess sludge according to another embodiment of the present invention is characterized in that said ultrasonic wave applying means and said reduced pressure swelling means are constructed as separate parts, the ultrasonic wave applying means and reduced pressure swelling means being serially connected directly or through the medium of other equipment.

According to this embodiment, the ultrasonic wave applying means and the reduced pressure swelling means are separate parts, thus allowing for a design which maximizes the performance of the respective parts. Furthermore, the operating conditions of the processes of application of ultrasonic waves and reduced pressure swelling can be freely controlled independently for respective optimization.

An apparatus for reducing excess sludge according to yet another embodiment of the present invention is constructed as a single apparatus having the functions of both said ultrasonic wave applying means and said reduced pressure swelling means.

According to this embodiment, the ultrasonic wave applying means and reduced pressure swelling means are constructed as a single apparatus, thus allowing for a design capable of holding the size of the apparatus to a minimum. Additionally, the cost of the apparatus overall can be reduced, thus enabling the apparatus to be easily controlled as well.

An apparatus for reducing excess sludge according to yet another embodiment of the present invention is characterized in that the ultrasonic wave applying means includes an ultrasonic vibrator, and said reduced pressure swelling means comprises a plate having a plurality of through holes formed therein, provided at a position downstream of said ultrasonic vibrator such as to intersect flow.

According to this embodiment, the plate (porous plate) positioned against the flow gives rise to the reduced pressure swelling effect, thereby ensuring a high level of solubilization.

An apparatus for reducing excess sludge according to yet another embodiment of the present invention is characterized in that a flow-receiving plate is provided between said ultrasonic wave applying means and said reduced pressure swelling means so as to obstruct flow.

According to this embodiment, the flow-receiving plate that is provided on the flow path increases the ultrasonic wave cavitation effect, changes the flow of the solution, and aids in mixture, so that a high rate of solubilization can be obtained even if the plate (porous plate) is given a larger hole diameter.

DETAILED DESCRIPTION OF PREFERRED EMBODIMENTS

Herebelow, embodiments of the present invention shall be described with reference to the drawings.

Figure 1:
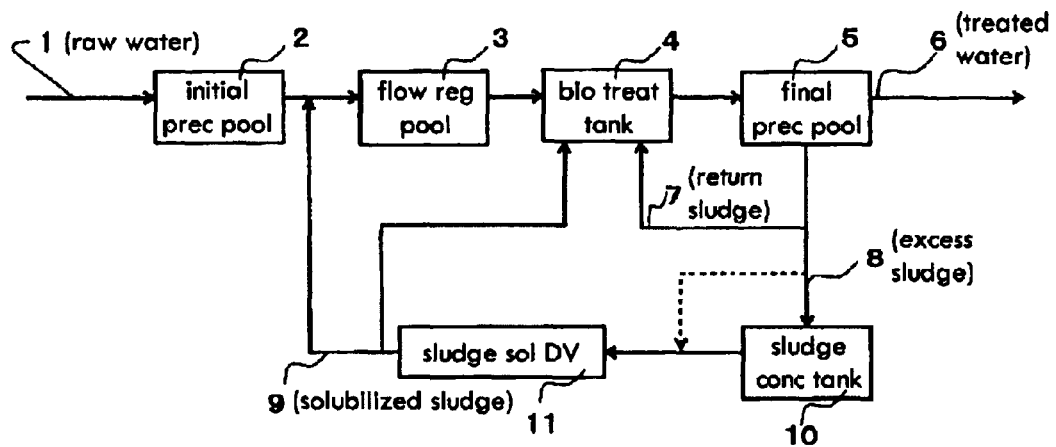
FIG. 1 is diagram showing a method for reducing excess sludge according to an embodiment of the present invention.

FIG. 1 shows a flow chart of an example of a sewage treatment method including the excess sludge reducing method according to an embodiment of the present invention. In FIG. 1, raw fluid 1 which is basically organic sewage is passed through an initial precipitation pool 2 and a flow regulating pool 3, then flows through a biological treatment tank 4 where it is treated by microbes, after which it is separated into solid and liquid parts in a final precipitation pool 5 to form treated water 6 and sludge (return sludge 7 and excess sludge 8). A portion of this sludge is returned to the biological treatment tank as return sludge 7, while the rest is taken as excess sludge, which may or may not be passed through a sludge concentrating tank 10, and is directed to a sludge solubilizing process DV 11 where the excess sludge 8 is solubilized and broken down. The solubilized sludge 9 is returned to the flow regulating tank 3 or biological treatment tank 4 or both in the sewage treatment process, and the solubilized sludge 9 is then broken down by microbes in the biological treatment tank 4.

The excess sludge 8 which is introduced into the sludge solubilizing process DV 11 is processed with an ultrasonic vibrator, and also undergoes a reduced pressure swelling process by a homogenizer for the solubilization treatment.

The sludge solubilization process DV 11 has the functions of both ultrasonic wave applying means and reduced pressure swelling means in the form of the homogenizer. This structure is shown in FIGS. 2–5.

Figure 2:
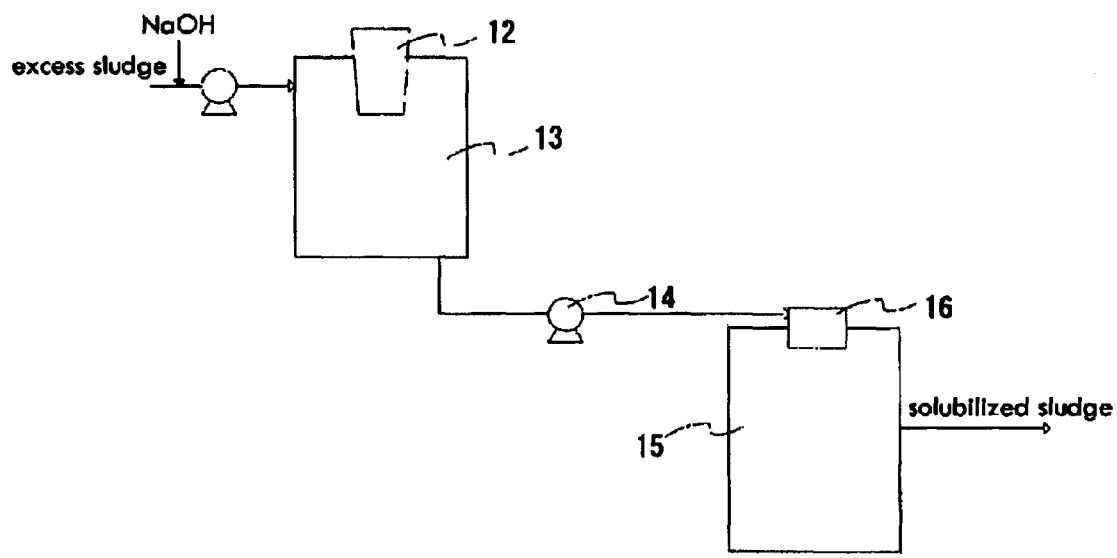
FIG. 2 is a schematic diagram showing an excess sludge reducing apparatus according to an embodiment of the present invention.
Figure 3:
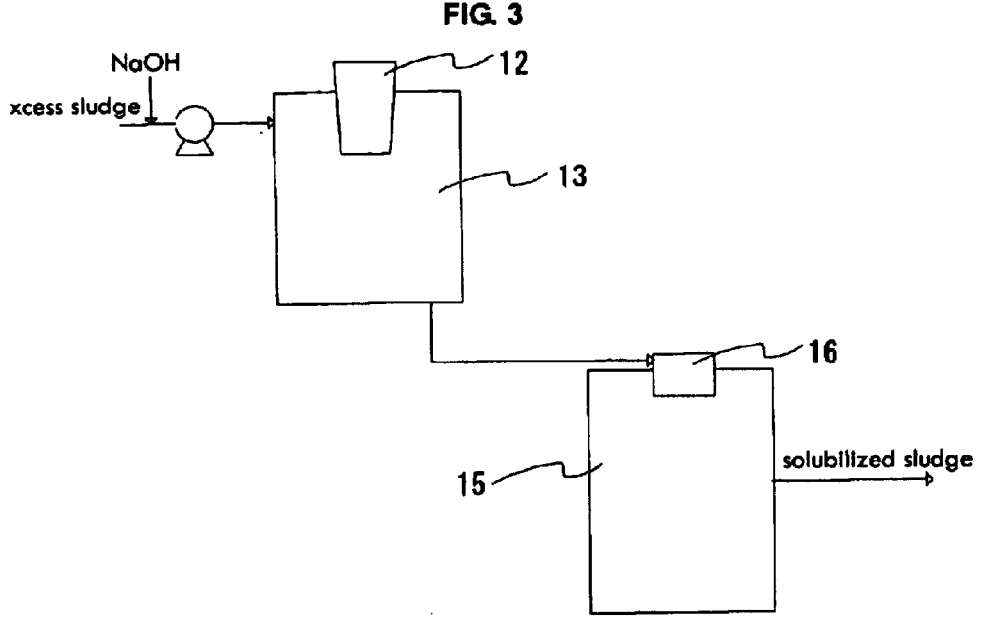
FIG. 3 is a schematic diagram showing an excess sludge reducing apparatus according to an embodiment of the present invention.

FIGS. 2 and 3 show embodiments in which the ultrasonic wave applying means and the reduced pressure swelling means (homogenizer) are separated and connected serially. In the drawing, 12 denotes an ultrasonic vibrator as a part of the ultrasonic wave applying means, 13 denotes an ultrasonic treatment tank, 14 denotes a pump, 15 denotes a reduced pressure swelling treatment tank, and 16 denotes a homogenizer used as reduced pressure swelling means.

Figure 4:
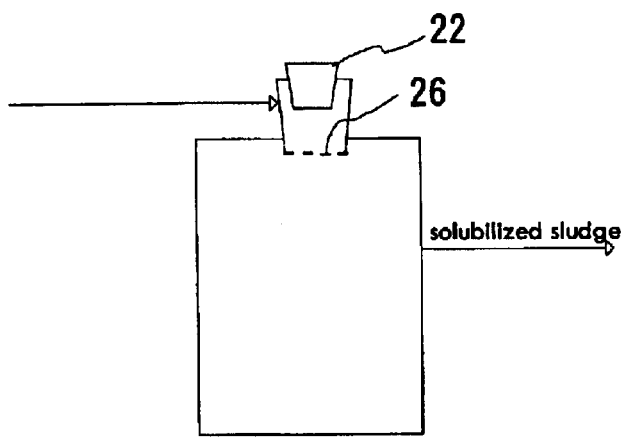
FIG. 4 is a schematic diagram showing an excess sludge reducing apparatus according to an embodiment of the present invention.
Figure 5:
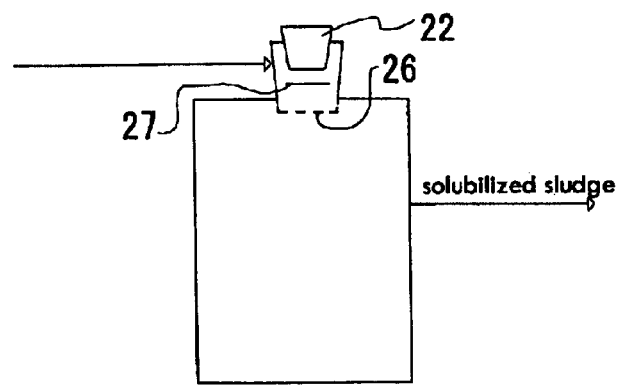
FIG. 5 is a schematic diagram showing an excess sludge reducing apparatus according to an embodiment of the present invention.

FIGS. 4 and 5 show a single apparatus having the functions of both ultrasonic wave applying means and reduced pressure swelling means (homogenizer). Those wherein these means are manufactured as separate parts, then assembled together by means of fastening means such as bolts and nuts shall be considered to be included among the single apparatus mentioned above.

FIG. 4 shows an embodiment wherein a porous plate 26 is placed immediately before the ultrasonic vibrator 22 in the direction of application of the ultrasonic waves, so that the excess sludge which has been exposed to the ultrasonic waves is sent to the porous plate 26 due to the propagation of the ultrasonic waves and the pressure from the pump.

Due to the employment of this structure, the pressure on the primary side of the porous plate 26 is high, but the pressure on the secondary side of the porous plate 26 is close to atmospheric pressure, so that the liquid which has passed through the porous plate 26 immediately lowers to a pressure close to atmospheric pressure. This pressure difference causes the microbes in the excess sludge to swell due to the sudden pressure drop, so that the bacteria which have undergone cavitation under the microscopic high frequency waves of the ultrasonic vibrations then undergo a swelling effect of the liquid itself, the destruction of the cell walls causing leakage of the content of the cells under further swelling effects, and finally being treated by solvents such as alkalis to form substances that are easily broken down by microbes. Additionally, the cell walls which have been damaged by the action of the alkali solvent and ultrasonic waves are completely destroyed by the reduced pressure swelling, thus promoting the leakage of the fluids contained therein.

FIG. 5 shows an embodiment in which a flow-receiving plate 27 is placed immediately before the ultrasonic vibrator 22.

By employing this structure, the solution which has been treated by the ultrasonic waves is kept at a high pressure by the flow receiving plate 27, passes through the passages to the sides of the flow-receiving plate 27, is relieved of the pressure at the exits to the cell (porous plate 26), and there undergoes swelling so as to destroy the cell walls and promote leakage of their content.

The exit of the cell may be a porous plate, a showerhead type plate or a single circular hole. Of these, the showerhead type plate and single circular hole are not easily clogged, so that even if insoluble matter other than microbes are mixed therein, there is no need for a foreign matter removing step preceding this treatment, and the operation can be performed stably. When considering overall factors such as clogs and the reduced pressure swelling effect, it is desirable to use a showerhead plate.

Additionally, the above-mentioned flow-receiving plate 27 may be flat or of arcuate shape. While it is desirable to provide a flow-receiving plate 27, under special circumstances, a certain degree of effectiveness can be achieved without providing a flow-receiving plate 27.

In this way, with the method and apparatus for reducing excess sludge according to the present invention, the solubilization effect is raised by applying ultrasonic waves under alkaline conditions, then applying a homogenizer, or applying these processes simultaneously. That is, the synergistic effects of the ultrasonic waves and homogenizer are able to raise the solubilization effect of the microbial cells. Here, the homogenizer is an apparatus which passes the subject material through a porous plate under pressurized conditions and instantly depressurizes the material, thereby destroying the cells of microbes and causing the content of the cells to leak out.

The process of destroying or damaging the cell walls of microbes with the application of alkalis and ultrasonic waves, causing the content of the cells to leak outside the cells and converting them to substances which can be handled by microbes is important. In order to perform this step, the pressure of a partially solubilized liquid is raised and instantly depressurized, causing the cells to swell, so that the contents of cells with damaged or destroyed cell walls will spill out of the cells, to be acted on by the alkalis to change into substances that are readily decomposed by microbes.

In some cases, the viscosity of the excess sludge can be raised by the action of the alkalis and ultrasonic waves, thereby increasing the resistance to microscopic movements of substances in the liquid, thereby lowering the susceptibility of the partially solubilized cells and liquid itself (alkali liquid) to mixture, making solubilization by further decomposition difficult so that the solubilization effects cannot be improved. In order to overcome this problem, the homogenizer is used to obtain a synergistic effect. While alkalis have been used above, similar effects can be obtained using other types of bacteriolytic agents.

Additionally, the solubilized sludge can then be returned to the former stages of the biological treatment process, to be broken down by other microbes to reduce the excess sludge.

Herebelow, the method and apparatus for reducing excess sludge according to the present invention shall be described in detail with reference to examples.

EXAMPLE 1

Solubilization tests were performed on sludge (from a food processing factory) obtained during treatment of organic sewage with aerobic microbes under the following conditions.

| | |
|---|---|
| Sludge Concentration: | 10050 mg/liter, pH 6.3 |
| pH Adjuster: | NaOH |
| Initial Solubilization pH: | 12 |
| Ultrasonic Frequency: | 19 Hz, Output 400 W, Retention Time 1 min (using equipment produced by Seidensha Electronics Co., Ltd.) |

As an indicator of solubilization, the sludge was separated in a centrifuge (10 min at 4000 rpm), and judged on the basis of measurements of the increase in COD concentration in the sludge using the recovered fluid in measurements of the oxygen consumption rate by potassium dichromate ($COD_{cr}$) at 150° C. (in accordance with the JIS K0102 standard). This measurement was made using a colorimeter and COD reactor manufactured by HACH Corporation.

TABLE 1

| | A | B | C | D | E | F |
|---|---|---|---|---|---|---|
| COD (mg/l) | 255 | 1880 | 5205 | 6560 | 6860 | 6425 |

A: Only homogenizer.
B: Alkali homogenizer.
C: Alkali ultrasound.
D: Alkali ultrasound + serially connected homogenizer (FIG. 3).
E: Alkali ultrasound + integral porous-plate homogenizer (FIG. 4).
F: Alkali ultrasound + integral showerhead homogenizer (FIG. 5).

Table 1 shows the results of solubilization using the excess sludge from a food processing factory. The homogenizers of the structures shown in FIGS. 3, 4 and 5 were respectively used. The porous plates of FIGS. 3 and 4 had pores with a diameters of 1.5 mm, with a porosity of 38%, with the showerhead plate of FIG. 5 having six holes with a diameter of 4.5 mm each. For the purposes of comparison, the results for the cases where no homogenizer is used, where only the homogenizer is used and only alkalis are used are also shown. The pressure of the pump sending liquid to the homogenizers was 4.0–6.0 $kgf/cm^2$.

As can be seen in Table 1, the solubilization effects improved dramatically when using a homogenizer as opposed to cases in which a homogenizer was not used. Additionally, it can be seen that the solubilization effects are not as significant when using only a homogenizer. While the showerhead type plate gave poorer results than the porous plate, it still demonstrated a marked improvement over the case where only ultrasonic waves are used. Additionally, the fact that the integral type apparatus gave better results than the separate serial type is notable. This is believed to be due to the presence of resistance against direct flow. In any case, Table 1 serves to demonstrate that the COD changes in sludge which has undergone a reduced pressure swelling effect in a homogenizer.

EXAMPLE 2

A biological treatment experiment was performed to turn the sewage from the same food processing factory into water in accordance with the flow chart of FIG. 1. The experiment was performed by sending fluid which had been solubilized by ultrasonic waves and a homogenizer at room temperature and alkaline conditions (initially ph 12) to a fluid rate regulating tank without adjusting the pH, and observing the effects of the biological treatment. The results are shown in Table 2.

The testing conditions were as follows:

| | |
|---|---|
| Water Flow Rate: | 50 liters/day |
| Water BOD: | 1050 mg/liter |
| Water Flow Regulating Tank: | 50 liter |
| Amount of Sludge to Solubilization: | 3.2 times amount of excess sludge |
| Solubilizing Agent: | NaOH |
| Ultrasound Exposure Time: | 1 minute |

TABLE 2

| | O | A | B | C | D | E | F |
|---|---|---|---|---|---|---|---|
| Quality of Treated Water | | | | | | | |
| BOD (mg/l) | 7.5 | 7.5 | 7.2 | 7.3 | 7.3 | 7.6 | 7.4 |
| COD (mg/l) | 7.5 | 8 | 10 | 12 | 14 | 14.2 | 14.1 |
| SS (mg/l) | 11 | 11 | 11.5 | 11.4 | 11.3 | 11.2 | 11.3 |
| pH | 7.2 | 7.2 | 7.3 | 7.3 | 7.3 | 7.3 | 7.3 |
| BOD Sludge Conversion Rate (g-SS/g-BOD) | 0.44 | 0.42 | 0.31 | 0.14 | 0.04 | 0.02 | 0.02 |

O represents an experiment made using a test apparatus without the solubilization step in the flow chart of FIG. 1, while the others are the same as their counterparts in Table 1.

As shown in Table 2, the results for the case of solubilization with only a homogenizer in the pressure range of 4.0–6.0 kgf/cm² are almost the same as those for the case where there is no solubilization step, and this is clearly due to the fact that there is no sludge reducing effect. While significant solubilization effects did appear in the case of the alkali homogenizer, the expected level of effects were not obtained. While there was a considerable reducing effect with alkali ultrasound, the BOD sludge conversion rate was still only 0.14. On the other hand, when applying ultrasonic waves under alkali conditions, then applying the homogenizer, in all cases the sludge generation rate was much lower than in the case of alkali ultrasound, and there was almost no difference in the treated water quality.

Upon comparison of the results of the respective experiments shown in Table 2 with Table 1, when taking the COD as the solubilization indicator for evaluating the solubilization, there is a solubilization effect in the case of a homogenizer with alkali ultrasound, but when taking the rate of conversion of the sludge as the indicator for evaluating the sludge reduction rate, the effect of the homogenizer is shown to be considerably large. This is believed to be due to the fact that the homogenizer promotes leakage of the content from the cell walls of microbes, thus assisting in biological treatments by further decomposition. From these results, the synergistic effect of alkali ultrasound and the homogenizer was confirmed to have a major impact on the sludge reduction effect.

As explained above, according to the method for reducing excess sludge according to the present invention, the solubilization effect can be raised by applying ultrasound under alkaline conditions, then applying a reduced pressure swelling process in a homogenizer, or applying these processes simultaneously. That is, by synergizing the action of the ultrasound with the action of the homogenizer, the effect of solubilization of microbial cells can be increased.

According to a method for reducing excess sludge based on another embodiment of the present invention, the alkalis contribute to the dissolution of proteins, are not harmful to the environment if neutralized, and further in biological treatment systems, and can be used to adjust the pH prevent reductions in pH due to dissolution of carbon dioxide gas.

According to an apparatus for reducing excess sludge based on another embodiment of the present invention, a high solubilization rate is ensured by reduced pressure swelling means, and the resulting high solubilization effect enables a high rate of reduction to be attained.

According to an apparatus for reducing excess sludge based on another embodiment of the present invention, solubilizing agents such as alkalis and ultrasound are used to destroy or damage the cell walls of microbes, and a reduced pressure swelling process causes the contents of the cells to leak out, after which further reactions by solubilizing agents causes them to be converted to substances which can be handled by microbes.

According to an excess sludge reducing apparatus based on another embodiment of the present invention, ultrasonic wave applying means and reduced pressure swelling means are separate apparatus, so that they can be designed for maximum performance of the respective apparatus, and the operating conditions of the ultrasonic wave application and reduced pressure swelling processes can be independently controlled for optimum results.

According to an excess sludge reducing apparatus based on another embodiment of the present invention, ultrasonic wave applying means and reduced pressure swelling means are provided in a single apparatus, so that the size of the apparatus can be designed to be made as compact as possible, thereby reducing the cost of the apparatus overall, and enabling the apparatus to be easily controlled.

According to an excess sludge reducing apparatus based on another embodiment of the present invention, a high solubilization rate is obtained by a plate placed to obstruct the flow.

According to an excess sludge reducing apparatus based on yet another embodiment of the present invention, a high solubilization rate is obtained by a flow receiving plate which is provided on the flow path.

What is claimed is:

1. A method of reducing excess sludge, characterized by adding a solubilizing agent to excess sludge generated by a microbial treatment of organic sewage; applying ultrasonic waves; applying a reduced pressure swelling treatment; and returning the result to the microbial treatment, thereby reducing the volume of said excess sludge.

2. An excess sludge reducing method in accordance with claim 1, wherein said solubilizing agent is an alkali, a bacteriolytic agent, or a combination thereof.

3. An apparatus for reducing excess sludge, characterized by comprising means for adding a solubilizing agent to excess sludge generated by microbial treatment of organic sewage; ultrasonic wave applying means for applying ultrasonic waves; and reduced pressure swelling means, provided downstream of the ultrasonic wave applying means, for applying a reduced pressure swelling process to the excess sludge.

4. An apparatus for reducing excess sludge in accordance with claim 3, wherein said reduced pressure swelling means is a homogenizer.

5. An apparatus for reducing excess sludge in accordance with claim 3 or 4, wherein said ultrasonic wave applying means and said reduced pressure swelling means are constructed as separate parts, the ultrasonic wave applying means and reduced pressure swelling means being serially connected directly or through the medium of other equipment.

6. An apparatus for reducing excess sludge in accordance with claim 3 or 4, constructed as a single apparatus having the functions of both said ultrasonic wave applying means and said reduced pressure swelling means.

7. An apparatus for reducing excess sludge in accordance with claim 6, wherein said ultrasonic wave applying means includes an ultrasonic vibrator, and said reduced pressure swelling means comprises a plate having a plurality of through holes formed therein, provided at a position downstream of said ultrasonic vibrator such as to intersect flow.

8. An apparatus for reducing excess sludge in accordance with claim 3, wherein a flow-receiving plate is provided between said ultrasonic wave applying means and said reduced pressure swelling means so as to obstruct flow.

* * * * *